United States Patent [19]

Piotrowski

[11] 4,373,406

[45] Feb. 15, 1983

[54] FULL ACCESS PALLET SHUTTLE GUARDING

[75] Inventor: Tadeusz W. Piotrowski, Cincinnati, Ohio

[73] Assignee: Cincinnati Milacron Inc., Cincinnati, Ohio

[21] Appl. No.: 174,441

[22] Filed: Aug. 1, 1980

[51] Int. Cl.³ .............................................. F16P 3/04
[52] U.S. Cl. ...................................... 74/613; 74/616; 408/71; 408/710; 409/134; 198/346
[58] Field of Search ................. 74/612, 613, 615, 608, 74/616; 408/71, 710; 409/134; 29/33 P, 563; 198/346, 339

[56] References Cited

U.S. PATENT DOCUMENTS

| | | | |
|---|---|---|---|
| 1,823,375 | 9/1931 | Potter et al. | 74/612 |
| 3,703,124 | 11/1972 | Smith et al. | 409/134 |
| 3,986,617 | 10/1976 | Blomquist | 29/563 |
| 4,181,211 | 1/1980 | Nishimura et al. | 198/339 |

Primary Examiner—Kenneth Dorner
Attorney, Agent, or Firm—Thomas M. Farrell

[57] ABSTRACT

A machine tool has a pallet transfer system comprising a rotary deck having a pair of pallets oppositely disposed about a vertical rotary transfer axis, wherein at the transfer position, the pallets are further movable along a horizontal linear transfer axis toward and away from the pallet transfer system. A vertical guard plate is affixed to the rotatable section or deck of the transfer system, and the plane of the guard plate passes through the rotary transfer axis at an oblique angle to the linear transfer axis. The rotatable guard plate interacts with an elastomeric seal at the interface of a guard opening in a stationary guard assembly on a machine tool to substantially confine coolant overspray and the like within the machine guard enclosure. By passing obliquely across the linear transfer axes of the pair of parallel pallets, substantially full access of a stationary pallet lying outside the machine guard enclosure may be had.

3 Claims, 2 Drawing Figures

FULL ACCESS PALLET SHUTTLE GUARDING

BACKGROUND OF THE INVENTION

This invention generally relates to automatic machine tools such as milling machines, machining centers and the like which employ a plurality of pallets capable of being automatically interchanged between a service station and a machining station. At a machining station, a pallet within a machine guard enclosure is positioned so that its respective workpiece is capable of being operated upon the machine, while a pallet lying at the service position, outside the machine guard enclosure, may be serviced for removing a finished workpiece and placing a rough workpiece on the pallet for a subsequent machining operation.

It therefore becomes an important task for the designer to configure special guarding to complement a pair of pallets which may be carried on a rotary deck at a machine tool, with the following parameters in mind: (1) the guard should be of relatively simple design; (2) the guard should permit relatively full access to at least four sides of a pallet and workpiece; and (3) the guard should be operable to substantially fully enclose the machine guard system to prevent overspray of coolant and fly out of chips resulting from the machining operation.

It is therefore an object of the present invention, to accomplish a substantially full access guarding system for servicing the pallets in a pallet shuttle system.

Another object of the present invention, is to provide a simplified guard system for rotary pallet shuttle system capable of substantially enclosing a machining zone.

SUMMARY OF THE INVENTION

The invention is shown embodied in a machine tool having a machine tool pallet transfer system wherein a pair of similar pallets are oppositely disposed about a generally vertical rotary transfer axis wherein a deck carries the pair of pallets and the deck is rotatable about the vertical transfer axis to alternate the pallets between an exterior service, station and an interior machine interchange station. The machine tool has a machine guard assembly substantially enclosing the machining zone, and an opening is provided in the machine guard assembly in which is positioned the rotary deck of the transfer system. The transfer system is arranged so that the pallets are further movable along generally horizontal transfer axes toward and away from the pallet transfer system, wherein the transfer axes are oppositely disposed about the vertical transfer axis, parallel to one another. A pallet guard base is affixed to the rotatable deck and a generally planar guard body is affixed to and extends from the guard base, wherein the guard body passes through the vertical transfer axis along a line oblique to the linear transfer axes. The planar guard body is rimmed with an elastomeric sealing element which coacts with the opening in the machine guard assembly to substantially seal the interior of the machine guard assembly. The oblique attitude of the planar guard body relative to the parallel linear transfer axes in effect passes the guard across a corner of a rectangular pallet which may be carried on the pallet transfer assembly thereby permitting substantially full access to at least four sides of a pallet and workpiece, without unduly complicating the pallet guard structure.

DESCRIPTION OF THE PREFERRED EMBODIMENT

Figure 1:
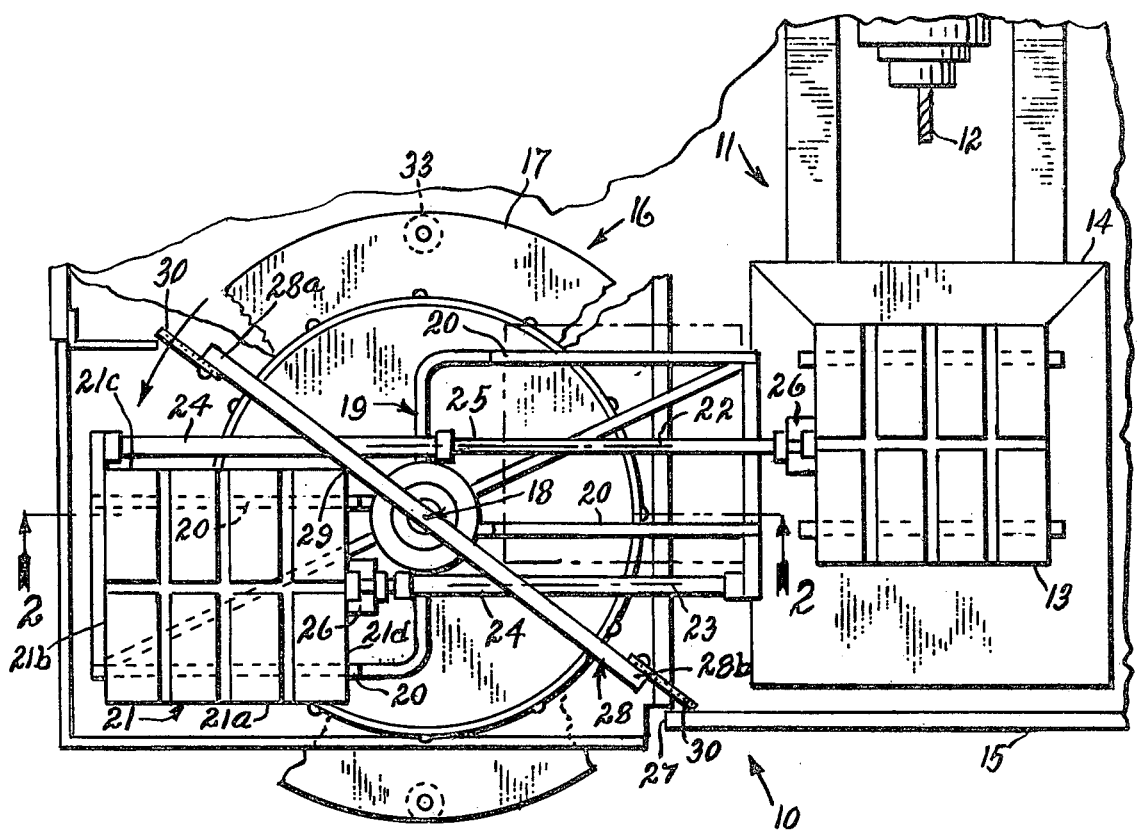
FIG. 1 is a plan view of a machine tool embodying the guard system of the present invention.

FIG. 1 of the drawings depicts a machine tool 10 having a machining zone 11 wherein a machine cutter 12 may interact with a positively located pallet 13 carried on a machine registering means, herein depicted as a slideway 14. The machining zone 11 is substantially enclosed by a machine guard assembly 15.

The machine tool 10 employs a rotary pallet shuttle assembly 16 for alternately transmitting a finished workpiece (not shown) out of the machining zone 11 and a rough workpiece into the machining zone 11. The pallet shuttle assembly 16 basically is comprised of a stationary base 17, having a vertical rotary transfer axis 18 upon which is carried a rotatable deck 19, herein depicted as a frame having a plurality slideways 20 for linear movement of a pallet on the slideway 20. A plurality of pallets 13,21 are utilized, which are substantially identical to one another, upon which are located respective workpieces (not shown) and the pallets 13,21 are oppositely disposed about the vertical transfer axis 18 and offset therefrom so as to be parallel to one another and linearly movable on the deck slideway 20 along respective linear transfer axes 22,23 toward and away from the pallet shuttle assembly 16. A pair of cylinders 24 are affixed to the pallet transfer deck 19, and a piston rod 25 extending from the cylinder 24 may be coupled through a suitable clamp 26, to move the pallets 13,21 along the linear transfer axes 22,23 at a desired time. The pallet 21 lying outside the general machine guard assembly 15 is considered a service station, wherein an operator may interact with a workpiece on the pallet 21 for a variety of purposes, such as location and inspection. The pallet shuttle assembly 16 sets within an opening 27 in the machine guard assembly 15, and the opening 27 is subtended by a substantially planar pallet guard 28 which is affixed to the pallet deck 19, and rotatable about the vertical transfer axis 18. The pallet guard 28 lies at an oblique angle to the linear transfer axes 22,23 of the pallet shuttle assembly 16, such that it passes across a corner 29 of a respective rectangular pallet 21 thereby permitting substantially full access to at least four sides 21a,b,c,d of the pallet 21 and workpiece. The pallet guard 28 has a strip of elastomeric material 30 at each vertical end 28a,b which may coact with the machine guard opening 27 to substantially enclose the machining zone 11 and prevent the overspray of coolant and fly-out of chips which may result from a machining operation. After a machining operation, the pallet 13 in the machining zone 11 is withdrawn by the piston rod 25 to the phantom position shown for a subsequent interchange of pallets. At such interchange time, the pallet deck 19 is rotated 180 degrees to bring the service position pallet 21 into alignment with the machining zone 11 and the machining zone pallet 13 to the service position. At such interchange time, the machine guard opening 27 is exposed, and after the interchange is completed, the pallet guard 28 closes off the opening 27 once again.

Figure 2:
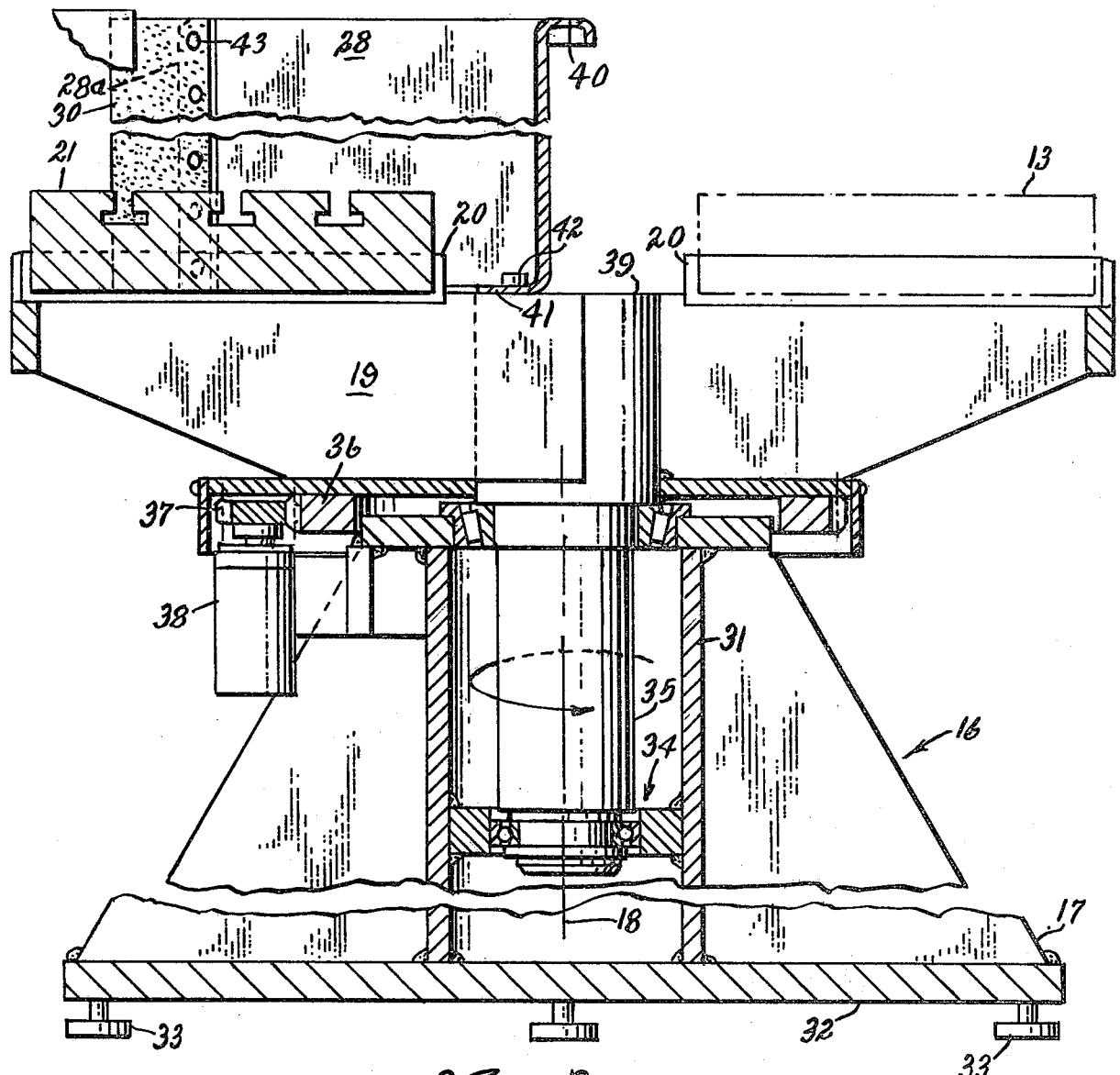
FIG. 2 is an elevational section taken along the cutting plane 2—2 of FIG. 1.

Referring to FIG. 2, the pallet shuttle base 17 is shown as being a substantially vertical tube assembly 31 having a lowermost plate 32 which is provided with adjustable floor supports 33. The vertical tube assembly 31 contains a bearing system 34 to journal the spindle 35 of the pallet transfer deck 19. The transfer deck 19 is provided with rotary drive gears 36,37 and motor assembly 38 to accomplish the rotation and interchange of the pallets 13,21. The topmost surface 39 of the pallet deck 19 carries a plurality of deck slideways for slidably carrying the service station pallet 21 shown in solid and the machine zone pallet 13, shown in phantom. The substantially vertical planar pallet guard 28 has an angled top edge 40 for stiffening purposes and a bottom edge 41 secured to the pallet deck surface 39 by screws 42 and the elastomeric sealing strip 30 is secured to the vertical ends 28a,b of the planar pallet guard 28 by screw fasteners 43. The elastomeric sealing strip 30 is shown coacting with the opening 27 in the machine guard assembly 15 to effectively seal the machining zone 11.

It is not intended that the invention be limited to the specific embodiment shown therein, but rather the invention extends to all such designs and modifications as come within the scope of the appended claims.

What is claimed is:

1. In a machine tool pallet transfer system having a pair of pallets oppositely disposed on a rotatable deck section about a generally vertical rotary transfer axis and movable along respective horizontal linear transfer axes toward and away from said pallet transfer system, an improved guard comprising:
   (a) a guard base affixed to said rotatable deck section of said pallet transfer system; and
   (b) a planar guard body, affixed to said base and vertically disposed along a horizontal line passing through said rotary axis at an angle oblique to said linear transfer axes, said planar guard body vertically extending to a point above said pallets, and horizontally extending to a diameter defined by a radial line from said vertical axis to the extreme edges of rotating pallets.

2. In a machine tool pallet transfer system having a pair of pallets oppositely disposed on a rotatable deck section about a generally vertical rotary transfer axis and movable along respective horizontal linear transfer axes toward and away from said pallet transfer system, an improved guard comprising:
   (a) means for offsetting said linear axes from coincidence with one another while maintaining parallelism of said linear axes;
   (b) a guard base affixed to said rotatable deck section of said pallet transfer system; and
   (c) a planar guard body, affixed to said base and vertically disposed along a horizontal line passing through said rotary axis at an angle oblique to said linear transfer axes, said planar guard body vertically extending to a point above said pallets, and horizontally extending to a diameter defined by a radial line from said vertical axis to the extreme edges of rotating pallets.

3. The improved guard of claim 2, wherein a pair of elastomeric sealing strips are affixed to respective opposite end vertical edges of said planar guard body.

* * * * *